United States Patent [19]
Iben et al.

[11] Patent Number: 5,674,424
[45] Date of Patent: Oct. 7, 1997

[54] THERMAL HEATING BLANKET IN-SITU THERMAL DESORPTION FOR REMEDIATION OF HYDROCARBON-CONTAMINATED SOIL

[75] Inventors: Icko Eric Timothy Iben, Glenville; William Alan Edelstein, Schenectady; Richard Blair Sheldon, Scotia, all of N.Y.; Scott Robert Blaha, Clifton, N.J.; William Bennett Silverstein, Philadelphia; Carl Richard Scatena, Horsham, both of Pa.; Gary Roland Brown, Sewell, N.J.

[73] Assignee: General Electric Company, Schenectady, N.Y.

[21] Appl. No.: 389,666

[22] Filed: Feb. 16, 1995

[51] Int. Cl.$^6$ ............................ H05B 3/34; H05B 1/00
[52] U.S. Cl. ............................ 219/549; 219/213
[58] Field of Search ................ 219/528, 548, 219/549, 213, 200, 552, 553

[56] References Cited

U.S. PATENT DOCUMENTS

| | | | |
|---|---|---|---|
| 4,984,594 | 1/1991 | Vinegar et al. | 219/528 |
| 5,193,934 | 3/1993 | Johnson et al. | 219/528 |
| 5,221,827 | 6/1993 | Marsden, Jr. et al. | 219/528 |
| 5,229,583 | 7/1993 | van Egmond et al. | 219/528 |
| 5,233,164 | 8/1993 | Dicks et al. | 219/528 |

*Primary Examiner*—Teresa J. Walberg
*Assistant Examiner*—Sam Paik
*Attorney, Agent, or Firm*—James Magee, Jr.

[57] ABSTRACT

An in-situ thermal desorption system which combines thermal desorption and vacuum extraction to separate organic compounds from in place contaminated soils is disclosed. A "heating blanket" desorption unit is applied directly to the surface of the hydrocarbon contaminated soil. The heating blanket assembly comprises of four basic components: a surface heating element, a thermal insulating mat, a vacuum collection system, and a vapor barrier. The surface heater, when energized, initiates a thermal front which moves down through the soil by thermal diffusion. As the soil is heated, organic compounds and water vapor are desorbed and removed from the soil matrix. A vapor collection system including a blower is fitted to the vapor barrier to establish a slight negative pressure inside the modular heating blanket units. The vacuum created by the in-line blower in the collection system sweeps clean air through and/or from the heat treated soil which purges volatile organic compounds (VOC), water, and other gases from the soil pores and sweeps in air from surrounding soils which is used to oxidize organics in the influent, within the heating elements, and within a thermal oxidizer. The off-gas is contained by the vapor barrier and collected via the blower. Air pollution control equipment is used to treat the off-gas, as necessary, to satisfy air emissions requirements.

4 Claims, 8 Drawing Sheets

THERMAL HEATING BLANKET IN-SITU THERMAL DESORPTION FOR REMEDIATION OF HYDROCARBON-CONTAMINATED SOIL

BACKGROUND OF THE INVENTION

Hydrocarbon contamination of soils is a widespread problem caused by early disposal practices, spills, leaks and application of pesticides or dust suppression chemicals or petroleum hydrocarbons. Regulatory requirements to remediate certain contaminated sites, such as, for example, a site of approximately fifteen acres of soil contaminated with low levels of polychlorinated biphenyls (PCBs) and petroleum hydrocarbons, led to the determination that the existing technologies for remediation of this type of contamination were either environmentally not acceptable to the general public or regulators, not cost-effective, or would not result in permanent destruction of the contaminants.

Prior in situ thermal desorption systems used a heating blanket concept similar to the thermal heating blanket developed by Dr. Harold Vinegar et. al of Shell Oil Company (U.S. Pat. Nos. 4,984,594 and 5,229,583, the disclosure of each is hereby expressly incorporated herein by reference). The electrically-powered surface heating blanket, as disclosed in U.S. Pat. No. 4,984,594, is positioned on the soil surface and is permeable to vapors which emanate from the soil when heated. A semi-permeable, thermally insulating mat is located above the electrical heater, and an impermeable sheet is placed on top of the mat. A vacuum is established through a hole in the impermeable sheet through which vaporized contaminants are drawn as the soil is heated. U.S. Pat. No. 5,229,583, utilized the concept of a metal furnace belt through which "calrod" type heaters could be inserted. This allowed the entire belt to be rolled up either on a sprocket drive or on a smooth tube.

In one Shell patent (U.S. Pat. No. 5,229,583), each heater had a separate electrical cable which was connected to a distribution panel. In order to move the heating blanket to a new location, an operator would have to disconnect and reconnect a large number of electrical connections (thirty three (33) for a three (3) inch spacing between heaters on about an eight (8) ft wide heating blanket).

The Shell concepts utilized the extraction of vapors from a point in the center of the blanket which would appear to preclude connection of a large number of heating blankets to a single, centralized off-gas treatment system. This concept was, in practice, time consuming during the connection of the off-gas collection system to the impermeable sheet and required that the operators walk on top of the thermal insulation.

Contaminants that can potentially be removed by the Shell processes consist of, but are not limited to the following: hydrocarbons; pesticides; chlorinated hydrocarbons such as PCB's and dioxins; radioactive wastes such as tritium and tritiated water; and heavy metal contaminants such as mercury, arsenic, etc. The process could also potentially be used for sterilization of soil and the destruction of undesirable biological activity. The Shell processes are alleged to be, in general, applicable to any contaminant which has a vapor phase at elevated temperatures (within the operational range of the heaters) and reduced pressures, and to contaminants which decompose or are trapped in order to remove the gaseous products at elevated temperatures.

The Shell processes disclosed in the patents appear to assume that the off-gases would be removed from the ground and treated by other means. However, the Shell heating blanket concepts as disclosed in the aforementioned patents make no provision for dealing with the hydrocarbon removal from the soil and specifically did not include such components as a thermal oxidizer, heated carbon drums, or an HCl scrubber as may be required for remediation of the broad range of hydrocarbon contaminants and large surface areas treatable by a large scale in situ thermal desorption system. In addition, the Shell heating blanket concepts disclosed above did not include or even mention a modular heating blanket approach, structural framework, insulation containment, process controls, quick electrical connections, and higher voltage and higher temperature heating elements as would be required for the remediation of any large area of contaminated soil in a reasonable time period at a reasonable cost.

Since the Shell heating blanket concepts did not include or even mention a modular approach, structural framework, insulation containment, process controls, quick electrical connections, or higher voltage/higher temperature heating elements, as would be required for the remediation of any large area of contaminated soil in a reasonable time period, thus, there is a need for an improved in situ thermal desorption system which includes an improved heating blanket, preferably of modular design, which is compatible with a single centralized off-gas treatment system and which can remediate a large contaminated area in a reasonable time and at a reasonable cost.

SUMMARY OF THE INVENTION

The present invention relates to the discovery that the remediation of hydrocarbon contaminants from a large area of contaminated soil can be achieved in situ by the use of electrically-powered resistive heaters incorporated in modular heating blanket units placed on top of the soil to thermally desorb the contaminants. With the system and methods of the present invention, a nominal area of, for example, 3200 square feet can be treated by the use of, for example, about eight foot (8') by about twenty foot (20') adjacent modular heating blanket units, each heating blanket unit having its own electrical power supply and controller, which are in turn connected in parallel to the main power supply and the off-gas ports of each unit is connected in parallel to a single off-gas treatment system. The size of the treated area can be varied by adding or removing heating blanket units consistent with power availability and the capacity of the off-gas heating system to maintain negative pressure below the units and adequately destroy the desorbed contaminants.

In one specific aspect, the in-situ thermal desorption heating blanket assembly and method of the present invention combines thermal desorption and vacuum extraction to separate organic compounds from in place soils. A "modular heating blanket" assembly comprising a plurality of modular heating blanket units is applied directly to the surface of the contaminated soil.

The modular heating blanket assembly, when energized, initiates a thermal front which moves down through the soil by thermal diffusion. Water is boiled at a given depth above which the temperature increases approximately linearly to the surface temperature. It is from the depths between the boiling water front and the surface where the semi-volatile contaminants are dissociated or desorbed. As the soil is heated, organic compounds and water vapor are desorbed and removed from the soil matrix.

One heating blanket assembly for remediation of soil having contaminants, in one form thereof, for an area greater than 100 square feet, comprises: a plurality of heating blanket units for heating the soil thereunder over an area greater than 100 square feet, each heating blanket unit comprising: heating means, operatively positioned proximate the soil surface, for heating the soil to a temperature sufficient to remove the contaminants; thermal insulation means operatively positioned above the heating means; and impermeable means, operatively positioned between the heating means and the insulation means, for minimizing the passage of contaminants and moisture therethrough; vapor barrier means, operatively positioned relative the heating blanket assembly, for preventing the escape of contaminants from the soil to the air; a vacuum collection system, operatively connected to each heating blanket unit, for recovering the resulting contaminants removed from the soil; and contaminant processing means, operatively connected to the heating blanket assembly, for processing the contaminants removed from the soil.

One representative heating blanket unit for use in soil remediation comprises: heating blanket support structure; at least one furnace belt; heaters operatively positioned within the at least one furnace belt; a connection mechanism for operatively connecting the at least one furnace belt to the heating blanket support structure; impermeable means, operatively connected to the heating blanket support structure and positioned above the at least one furnace belt having the heaters; and contaminate collection means, operatively connected to the impermeable means, for transporting the resulting contaminates removed from the soil to a contaminate processing means.

An objective of the in situ thermal desorption modular heating blanket assembly of the present invention is to cost-effectively remediate large areas of soils contaminated with a variety of hydrocarbons including PCBs.

Other objects of the present invention include: to remediate the soil in a manner that is safe to the workers and the public; to minimize the generation of additional waste by on-site destruction of contaminants; to achieve cleanup performance standards set by regulatory agencies; and to keep air emissions from the system below regulatory guidelines.

Other objects and advantages of the invention will be apparent from the following description, the accompanying drawings and the appended claims.

DETAILED DESCRIPTION OF THE SYSTEM(S) AND METHODS(S)

By system integration of several existing concepts combined with research into process optimization and novel application and modification of available components, a new and innovative technology was conceived and successfully demonstrated at the field pilot scale level. This demonstration concluded that an in situ thermal desorption system could safely remediate sites, as described below, in a nonintrusive manner while still being cost-effective and meeting high performance standards established by appropriate regulatory agencies.

Figure 1:
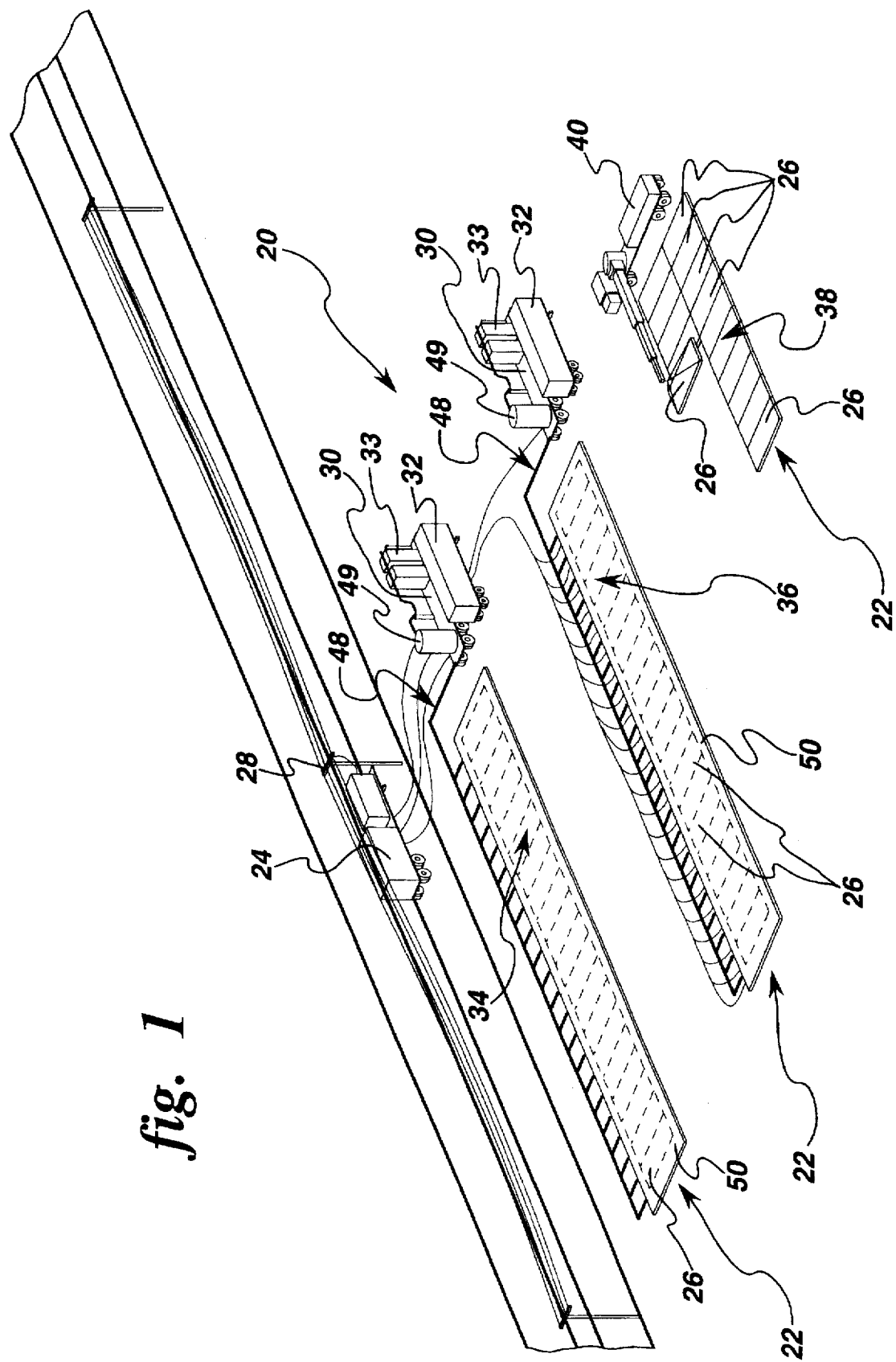
FIG. 1 is an isometric representation of a full scale remediation system which includes the modular heating blanket assembly of the present invention.

The overall remediation system 20, of which the thermal heating blanket assembly 22 is one portion thereof, is illustrated in FIG. 1. The remediation system 20 includes a transportable electric substation 24 to provide not only the energy necessary for the heating elements of each heating blanket unit 26 but also to power the control and process and off-gas treatment aspects of the entire system 20. As illustrated, the power for the electrical substation is preferably taken from standard utility wires 28 or alternatively, can be provided by a generator, such as, for example, a diesel powered generator (not shown).

The power provided by the transportable electrical substation 24 is utilized by preferably two operational sets of process equipment including a thermal oxidizer, operatively positioned in process equipment trailers 30 and control trailers 32. The power from the substation is utilized by the thermal heating blanket assembly 22 to heat the soil beneath the modular heating blanket units 26 which are arranged in a group to cover, for example, a section of approximately 3200 square feet.

As illustrated in FIG. 1, the first group 34 of heating blanket units 26 is depicted as being in the cooling cycle of the remediation process while the second group 36 of modular heating blanket units 26 is depicted as being in the heating cycle of the remediation process. A third group 38 of modular heating blanket units 26 is depicted as being in the assembly stage over the next area of the remediation effort. The group 38 of modular heating blanket units 26 being assembled utilizes a boom truck 40 for the placement of the individual modular heating blanket units 26. The truck 40, or other apparatus capable of placing the illustrated modular heating blanket units 26 on the soil to be remediated, operatively positions each of the modular heating blanket units 26 in a predetermined pattern.

The in-situ thermal desorption heating blanket assembly 22 separates organic compounds from contaminated soil. As shown in FIG. 1, the heating blanket "desorption" assembly 22 is applied directly to the surface of the contaminated soil. The heating blanket assembly 22 is the front end of the in situ thermal desorption remediation system 20 and is the component which volatilizes the PCB and other organic constituents from the near surface soils and begins the oxidation/destruction process.

The heating blanket assembly 22 is designed to accomplish the following: heat the soil surface so as to reduce PCB and other hydrocarbon concentrations in soils to a depth of about six (6) inches to less than about 2 mg/kg; collect heat treatment generated vapors including PCBs, organic matter, water and combustion products; and be lightweight, flexible, durable, and readily movable around the site as the remediation process proceeds across all site areas.

In order to accomplish the above objectives, each modular heating blanket assembly 22 comprises four basic components: electrically powered resistive heating elements 44 for heating the soil (see FIG. 3c); an insulation system 46 for preventing excessive heat loss to the ambient air and improve ground heating efficiency, a vacuum collection system 48 for removing any off-gases produced by the process (see FIG. 1) and an impermeable sheet 50, such as, for example, a silicon blanket for preventing the escape of any off-gases produced to the atmosphere.

Each of these components can be provided in a variety of physical forms. Due to the physical layout of the site and other logistical factors, the final treatment system design may incorporate more than one type of heating blanket assembly 22 incorporating the four basic components listed.

A typical heating blanket unit 26 representing one type for use on the majority of sites is shown in FIGS. 2 and 3a–g. As shown, the heating blanket support structure 54 includes at least two outer frame members 62 and 64; a plurality of cross-frame members 66, 68, 70, 72 and 74; at least two lower frame members 76, 78 and a bottom impermeable member 80 (see FIGS. 3a–f), preferably made of 20 gauge 309 stainless steel sheet, operatively connected together. The heating blanket unit 26 also includes piping means 82, preferably a two-inch stainless steel 309 pipe, operatively connected to an aperture 84 formed in the impermeable member 80 as part of the vapor barrier and collecting system 48.

Returning to FIG. 2, the support structure 54 consists of at least two lower frame members 76, 78, preferably made of stainless steel bar stock, preferably positioned below a top furnace belt 56 (see FIG. 3b). At least five cross members 66, 68, 70, 72 and 74, preferably made of carbon steel, are positioned perpendicular to the lower frame members 76, 78 and operatively connected thereto. At least two, preferably four-inch carbon steel, outer frame members 62, 64 are positioned above and operatively connected to the cross members. Additional lower frame members are positioned below outer frame member 62, 64 but are not shown in FIG. 2. A plurality of lifting lugs 60, preferably six, are operatively positioned around the perimeter of the unit 26 for enabling the unit 26 to be picked up and moved by the boom crane truck 40, as shown in FIGS. 1 and 3c.

Figure 3A:
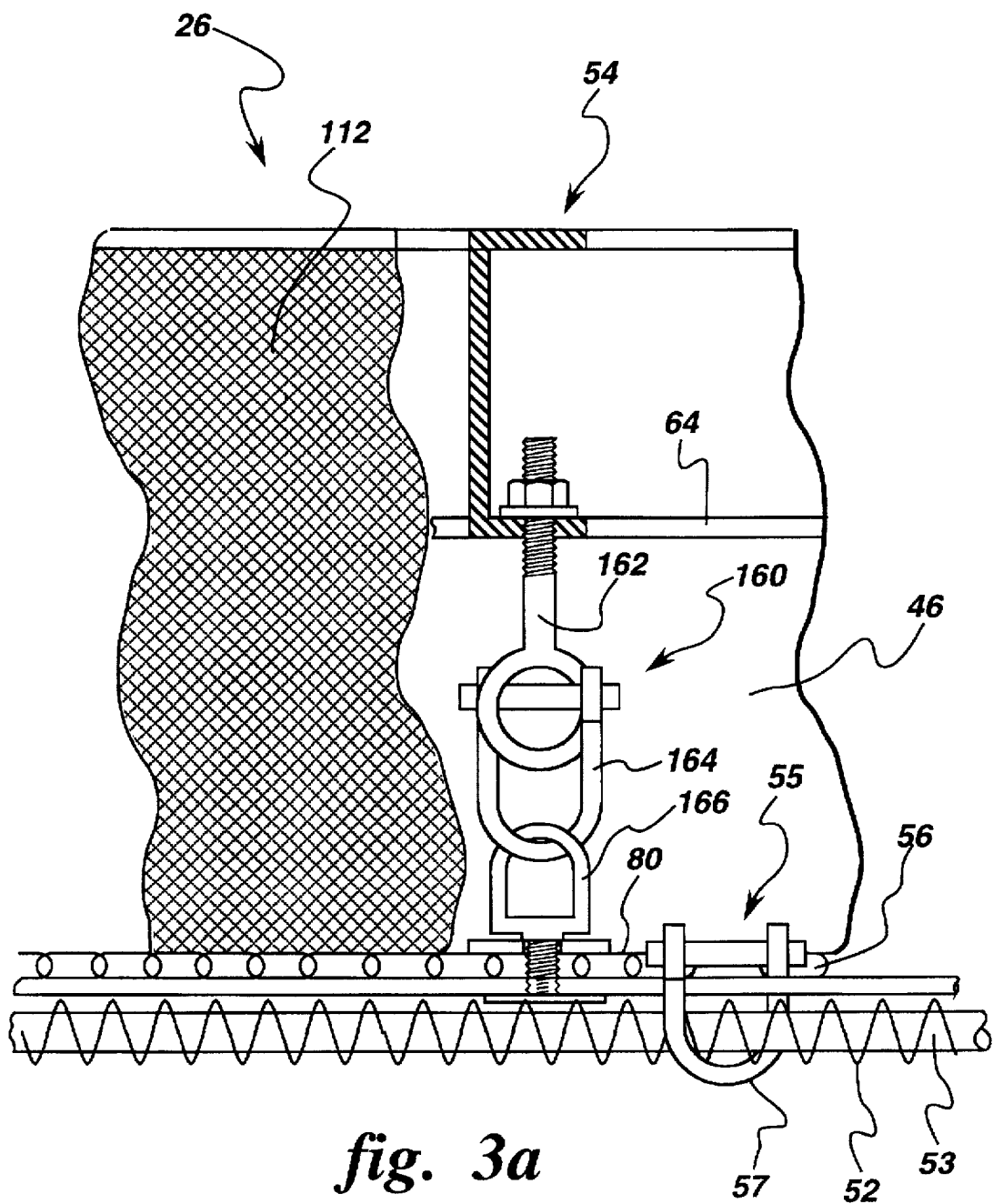
FIG. 3a is a sectional view along lines B—B of the modular heating blanket unit of FIG. 2 illustrating hanger bolt details.
Figure 3B:
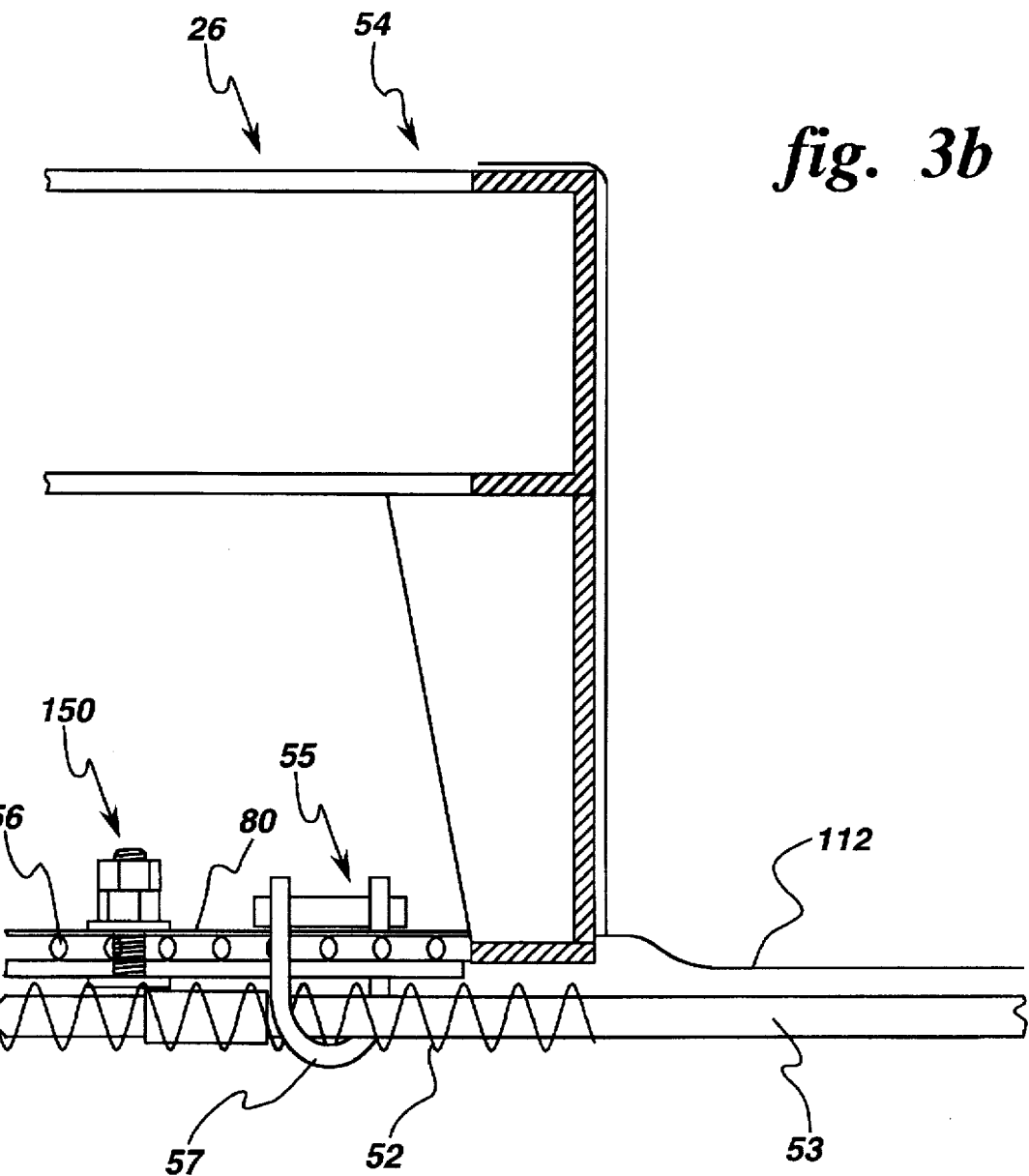
FIG. 3b is a sectional view taken along lines C—C of the modular heating blanket unit of FIG. 2 illustrating the corner leg details.
Figure 3G:
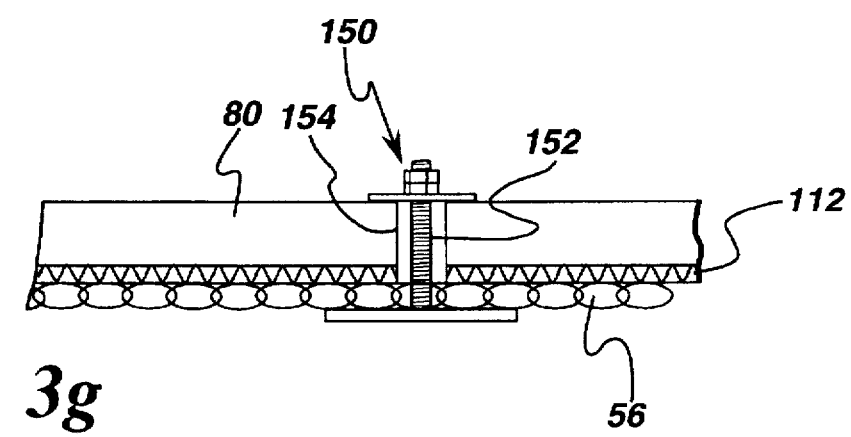
FIG. 3g is a sectional view of an elevator bolt mesh attachment mechanism.
Figure 3C:
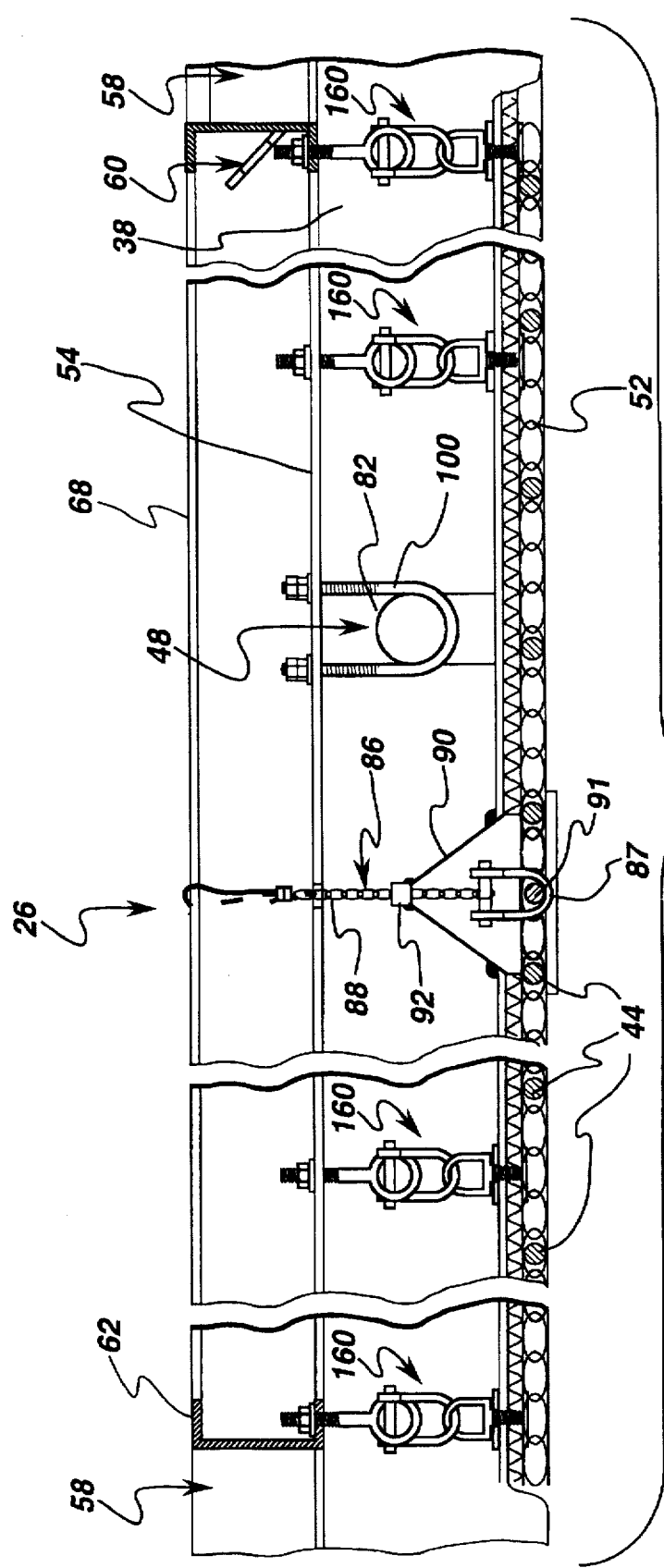
FIG. 3c is a cross-sectional view taken along lines D—D of the modular heating blanket unit of FIG. 2.

As shown in FIG. 3c, the heating blanket unit 26 includes a lower furnace belt 52, preferably made of 314L stainless steel. Heaters 44 are preferably interspaced within the lower furnace belt 52 at intervals of approximately, preferably, two inches, but could be spaced at intervals of, for example, four (4), six (6) inches etc. The lower furnace belt 52 is operatively connected to the unit support structure 54 via a connection mechanism 86, shown in detail in FIG. 3e. A shackle 87 is operatively connected to a rod 91, preferably about 0.5" diameter×about 20' long stainless steel rod, and is connected to a cross structural member, for example, 74 by a connection means 88, such as, for example, a metal cable/chain combination. A plurality, preferably five of these connection means 86, are positioned lengthwise across the center of each heating blanket assembly unit 26 and are utilized for the quick disconnect of the lower furnace belt 52 from the support structure 54 of each modular heating blanket unit 26 in order to provide access to the heaters 44 for maintenance purposes as may be required from time to time. The upper furnace belt 56 is preferably a B-24-18-14 belt made of 314L stainless steel. The lower furnace belt 52 is preferably a B-18-12-12 belt also preferably made of 314L stainless steel. Manufacture of acceptable furnace bolts include Maryland Wire Belt and Cambridge, Inc.

Above the point where the metal cable/chain 88 passes through the impermeable member 80, means 90, such as an inverted funnel, is operatively connected to the impermeable member 80, the inverted funnel 90 having means 92 provided therein for the passage of the cable/chain 88 therethrough. The funnel is optional but preferred. The unit 26 is operatively connected to the lower furnace belt 52 by attaching cable/chain 88 to a shackle 87 which operatively connects the cable/chain with a stainless steel rod 91 passing through the center row of links in the furnace belt 52.

Alternatively, a lifting mechanism, such as is used for working under cars, could be used to support the unit 26 so that a technician can replace heaters 44 from the underside of the unit.

Positioned above the lower furnace belt 52 is an upper furnace belt 56. Immediately on top of the upper furnace belt 56 and operatively connected thereto is the impermeable stainless steel plate 80, preferably made of 20 gauge 309 stainless steel sheet.

The cable/chain 88 passing through the central five (5) funnels 90 provide for much easier alignment when reconnecting the lower furnace belt to the unit frame 54, which are then connected to the cross members, for example, 70. In order to prevent damage to the bottom furnace belt 52, the top furnace belt 56 is operatively connected to the impermeable member 80 and the support structure by a connecting mechanism 160, as shown in FIG. 3a. Connecting mechanism 160 comprises, for example, an eye bolt 162 operatively connected to member 64, 72, for example. An eye nut 166 is used to connect the upper furnace belt 56 and the impermeable sheet 80 together. A shackle 164 is then used to complete the connection of the impermeable mesh 80/upper furnace belt to the support structure 54.

As shown in FIG. 3a, the about 40"×about 40", preferably 309 stainless steel mesh 112 is incorporated in the perimeter of the unit 26 to provide containment for the insulation. The mesh 112 was chosen such that the insulation material, particularly medium sized vermiculite, would not pass through the open spaces in the mesh. Mesh was chosen over other possible materials because, among other features, it is flexible and has the ability to connect components having very different temperatures When in operation and which expand differently during the heating cycle. The stainless steel mesh 112 has a minimum about six-inch run out between the stainless steel member 80 and the furnace belt 56. As also shown in FIG. 3a, a preferably one-half inch 309 stainless steel rod 53 is inserted through the last row of links on each edge of the lower furnace belt 52.

As shown in FIG. 3b, a connecting means 55 is utilized to maintain the lower furnace belt 52 in contact with the upper furnace belt 56 and the remainder of the support structure 54 of the unit 26. The connecting means 55 as shown, is operatively connected to the lower furnace belt at a plurality of points around the outer perimeter of the lower furnace belt 52. The connecting means 55 preferably comprises a shackle 57 operatively connected to the rod 53 inserted into the last spiral of the lower furnace belt 52. Each individual unit 26 is intended to be flexible with all bolt holes oversized to allow for expansion and contraction.

In order to disassemble the lower furnace belt 52 having the heaters 44 from the modular unit 26, it is necessary only to remove the plurality of shackles 57 from the rod 53 and to disconnect the five center funnel supported cable/chain combination 88. Once this is accomplished, the lower furnace belt 52 having the heater units 44 therein, is easily removed from the remainder of the support structure 54.

Figure 3D:
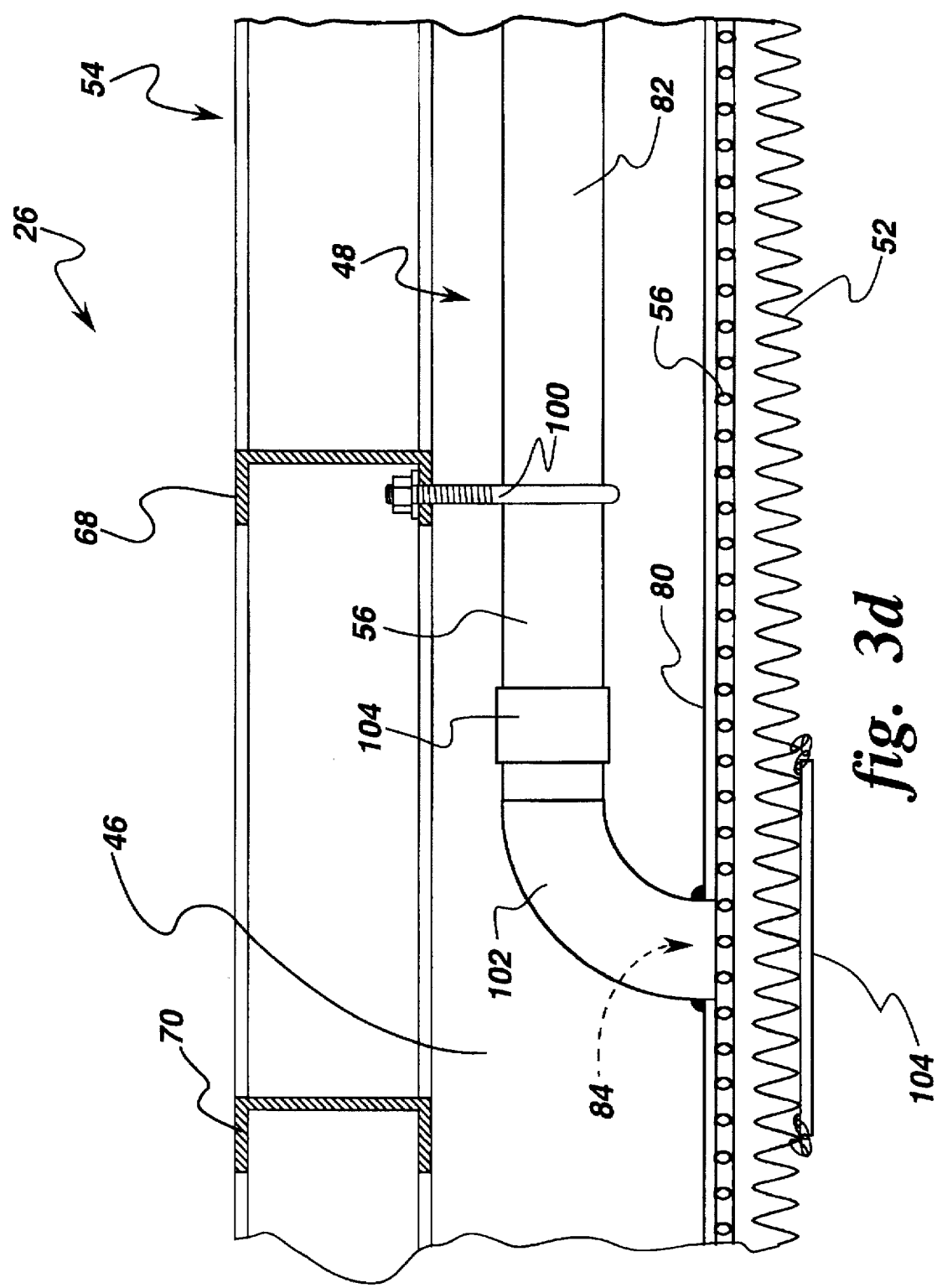
FIG. 3d is a sectional view taken along lines E—E of the modular heating blanket unit of FIG. 2 illustrating the exhaust port section.
Figure 3E:
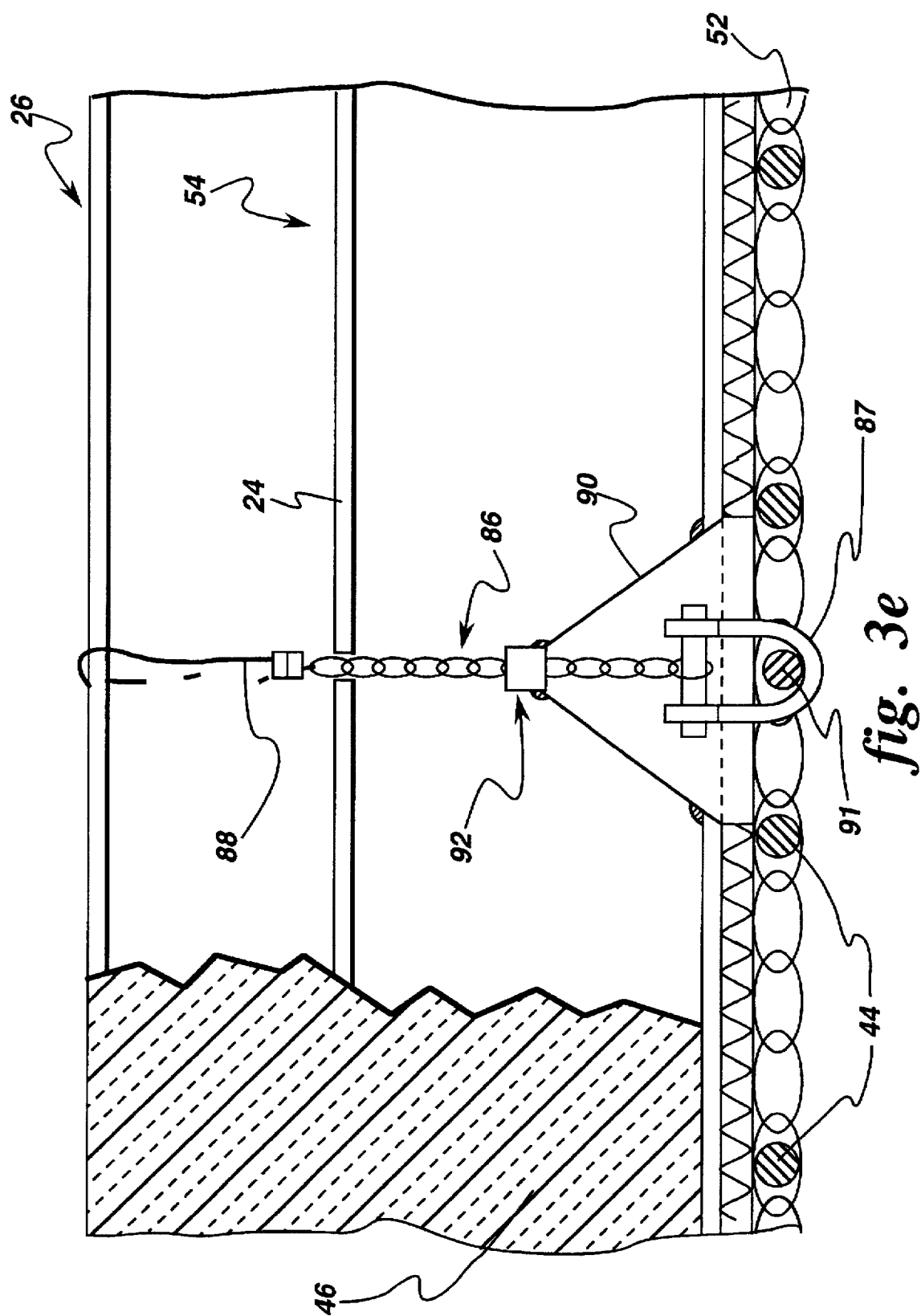
FIG. 3e is a sectional view taken along lines F—F of the modular heating blanket unit of FIG. 2 illustrating the lower belt support.

As best illustrated in FIG. 3d, in order to remove the desorbed contaminants from the soil, and to prevent the extraction of loose soil which may be directly beneath the exhaust port or the aperture 84 in the impermeable member 80, a barrier means, such as, for example, a two (2) foot by two (2) foot one-eighth inch thick stainless steel plate 104 is operatively positioned either between the upper 56 and lower 52 furnace belts or, preferably, under the lower 52 furnace belt and operatively connected thereto and centered under the exhaust port or aperture 84 in the impermeable means 80. This particular design minimizes the "vacuuming up of dry dust from the soil which might clog the collection system down stream. Wire mesh at this position in the system is not advisable as it clogs very easily and would require frequent attention.

As shown in FIGS. 1, 2, 3d and 3f, the vacuum collection system 48 for removing the off-gases extracted from the soil by the in-situ thermal heating blanket assembly 22 includes stainless steel pipe 82, preferably two-inch 309, 310 or 314 stainless steel pipe, having a two-inch flange 98 at one end (see FIG. 3f) operatively supported by the modular heating blanket support structure 54 via u-bolts or pipe hangers 100 which are positioned so that the pipes 82 are provided with a certain amount of float capability. The pipe 82 is inserted into the support structure 54 at one end and is then operatively connected in a conventional manner, such as, for example, by welding to an aperture 84 in the member 80 which acts as the impermeable means. The other end of the pipe 82 having the flange 98 is then operatively connected to the vacuum collection system 48, as shown, for example, by welding or bolting, etc. The pipe 82 is connected to an elbow 102 by means, such as, for example, a threaded coupling 104 or by welding or other conventional means for the effective evacuation of the off-gases to the processing trailer 30.

At the end the exhaust port or piping flange 98, a two-inch carbon steel channel 115 is utilized to provide support for the heater ends 116 and connections thereto. This portion is flush with the top of the frame 54.

Figure 3F:
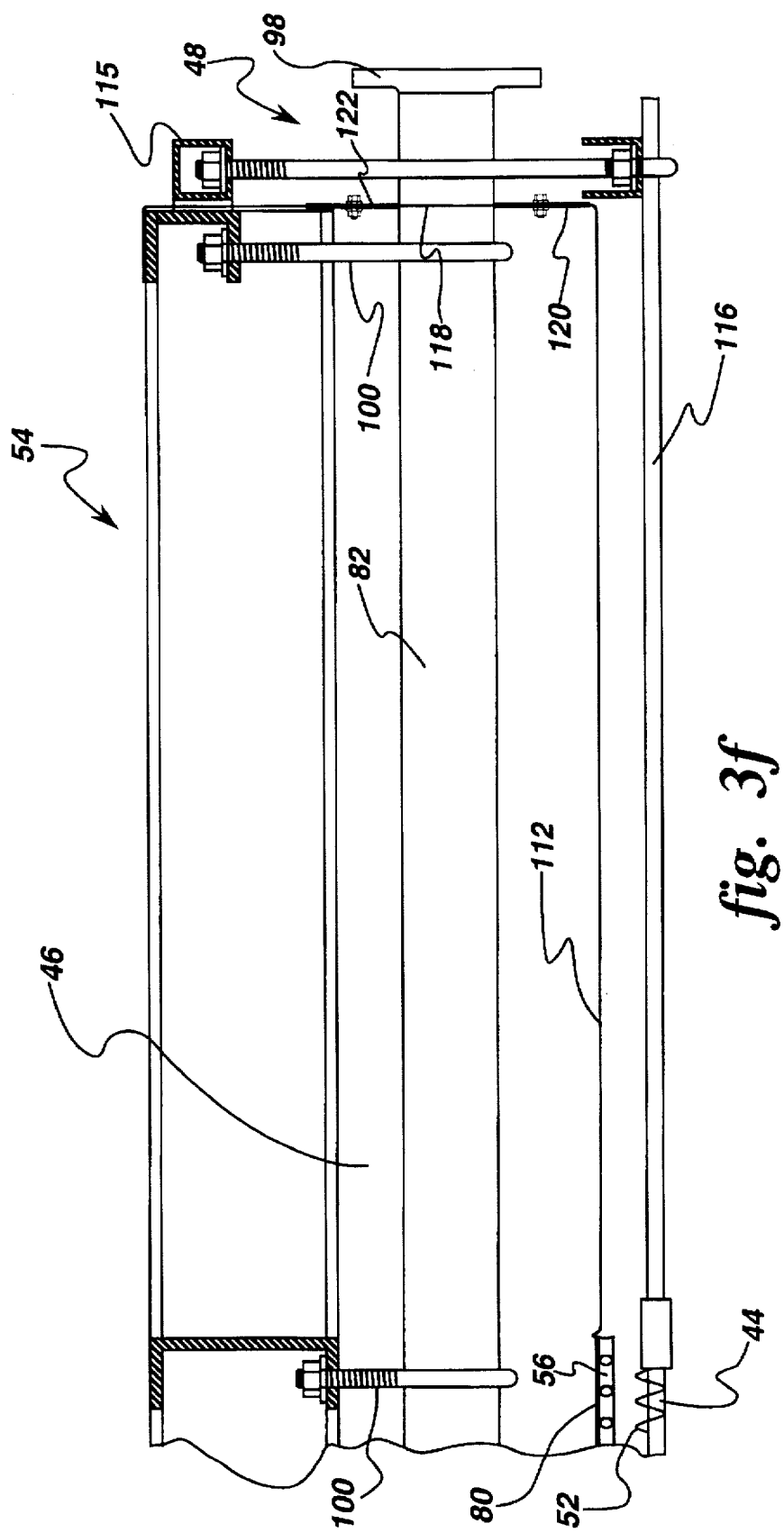
FIG. 3f is a sectional view taken along lines G—G of the modular heating blanket unit of FIG. 2 illustrating the exhaust port end section.

FIG. 3f illustrates the details of the heater connection 116 and the off-gas collection system connection exhaust port 98. As shown, the heater connection 116 is connected to the heating elements 44 which are fed through the links in the lower furnace belt 52. The exhaust port 98 of the modular unit 26 includes a wall member 110 having a reinforcing ring 122 operatively positioned around the exhaust pipe 82. The reinforcing ring 122 is preferably 20 gauge stainless steel and more preferably has a six-inch inner diameter which is about 0.05 inches greater than the pipe 82 outer diameter.

The vacuum collection system 48 includes a piping network which, preferably, comprises 2-inch diameter pipes operatively connected to six-inch diameter insulated header pipes which are operatively connected in turn to the process trailer(s) 30. Pipe sections are moveable by, for example, a small track-mounted crane, and are designed to be modular in nature.

The flexible pipe (see FIG. 1) is connected to the exhaust port 98 via a flange assembly. The flexible pipe has thermal insulation, preferably capable of withstanding 900° C. temperatures (e.g. 3 inches of duraflex-S from Carborundum Corporation), positioned on its outer surface such that the temperature at the outside of the insulation will be to below 200° C. so that the silicone in the impermeable sheet 50 will not be melted. The insulation is then wrapped with a water resistant coating of the same material as the impermeable sheet (e.g. silicone fiberglass cloth). The flexible hoses then run along the ground and out from under the fiberglass reinforced silicone cloth impermeable sheet. The hoses are sealed in the same manner as the sheet 50 with sandbags or an equivalent weight being placed on top of the impermeable sheet 50 and the thermally insulated flexible hose.

In the area 46 between the impermeable member 80 and the top of the unit 26, sufficient thermal-insulation (not shown), such as, for example, vermiculite, is placed to minimize heat loss through the top of the system to the surrounding air. Between about (six) 6 inches and about eight (8) inches of vermiculite (preferably medium grade from Schundler corporation, Metuchen, N.J.) which worked well in the tested environment is believed sufficient for most applications. In general, the finer the grade particles of vermiculite, the better the thermal insulation properties, but if the particulates are too fine, then the particles are more difficult to contain within the unit.

Figure 2:
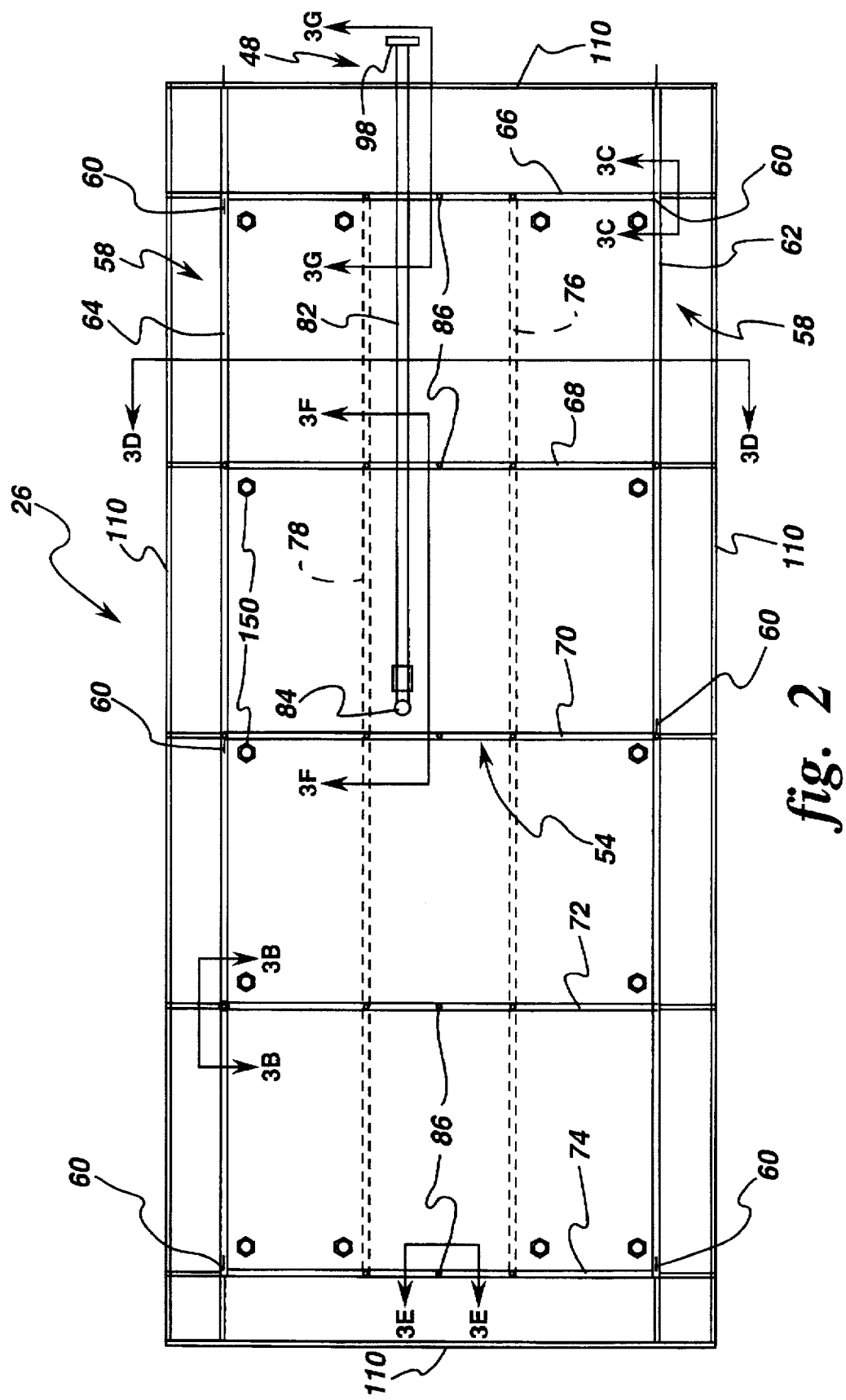
FIG. 2 is a top view of a representative modular heating blanket unit of the present invention utilized with the remediation system of FIG. 1.

As shown in FIGS. 3a and 3g, the insulation is contained from spilling out the sides of the unit by attaching stainless steel mesh 112 to the unit support structure 54 and between the member 80 and the top furnace belt 56 to form containment "baskets" for containing the insulation. Around the front of the unit 26 is a one-inch angle frame, preferably carbon steel, member 110 which is utilized to support the stainless steel mesh 112. The first and last units 26 in a row of units requires a special perimeter insulation containment "basket", which is identical in construction to the "baskets" 58 on the front and back of each unit 26, as shown in FIG. 2, depending on which end of the row of units a particular unit is placed.

FIG. 3 shows the preferred means 150 for operatively connecting the impermeable means 80, the wire mesh 112 and the upper belt 56. As shown, an elevator belt 152 is inserted through the upper furnace belt 156, the mesh 112 and the impermeable member 80. Once assembled the means 150 maintains the upper furnace belt, wire mesh and impermeable member in close operative contact, with the lower furnace belt being easily removed because it is separately connected to the support structure 54.

As shown in FIG. 1, the impermeable sheet 50, preferably made of fiberglass reinforced silicone rubber cloth, is placed over the entire row of units 26, extending out at least 5 ft past the edges. Sand bags or sand filled fire hose or equivalent material (not shown) is placed on top of the impermeable sheet 50 along the entire assembly 22 perimeter. This minimizes the presence of air gaps between the soil and the impermeable sheet 50 which tend to offer low resistance paths for the air being swept along the heated surface. Without the sand bags, it is difficult to maintain a negative pressure over the heated zone.

Returning to the heaters 44, in one currently preferred embodiment, each, preferably about forty-eight (48), single element tubular heater elements or healing cables, capable of achieving temperatures on the outer surface of about 900° C.±100° C. and which have a total power delivery of about 563 W $ft^{-2}$, are interspaced into the furnace belt 52 at preferably about two (2) inches apart. It should be understood that the number and spaces for the heater will vary with each application and that as few as twelve (12) heaters may be all that is required for a specific application. Each heater has an additional about two foot (2') cold end 116 to which the electrical connections from the power source can be made. Three groups of eight (8) heaters are first connected in series and then connected to the electrical power source. The cold ends can be either copper or nickel, but should be welded to the heater core. The sheath of the heating cable should also be welded to the sheath of the cold ends. Silver solder, which melts at around 630°±30° C. will not suffice for heaters operated at 900° C.±100° C.

In another possible embodiment, about twelve (12) tubular heater elements or heating cables 44 are bent in a U-shape with a bending diameter of about four inches (4.0") to form two parallel legs about twenty foot (20') in length and separated by about 4.0". Two foot long (2') copper or nickel cold leads are welded on the ends. The U-shaped heaters are interspaced into the furnace belt with all of the U ends on one side and the "cold ends" on the other and then connected to the power source. Each group of four (4) heaters is then connected in series and is then-connected to the electrical power source in the same manner as the preferred embodiment.

The heaters 44 may be commercial nichrome/magnesiumoxide tubular heaters with Inconel 601 sheaths operated at temperatures up to about 1250 degree(s) C. Alternatively, silicon carbide or lanthanumchromate "glowbar" heater elements, carbon electrodes, or tungsten/quartz heaters-could be used for still higher temperatures. Electrical power for the heaters is supplied at power line frequencies near 60 Hz.

In the present invention, the electrical connections for the heaters in a given modular heating blanket unit 26 would be made at the original time of assembly so that a single power cable with three (3) power and one (1) grounding wire are all that need to be disconnected and reconnected during a move from an old to a new location. This quick connect/disconnect feature is of significant importance in reducing setup/teardown time when remediating a large area in the minimum amount of time.

A light gauge stainless steel sheet vapor barrier is positioned over the heaters, and an insulation layer comprising suitable high temperature insulation, such as, for example, vermiculite or perlite, is positioned in the top portion 46 of the unit 26. As mentioned above, vapor collection is accomplished by placing the silicone-fiberglass composite sheet 50 on top of the heating blanket unit 26 with a sufficient overlap onto the surrounding soil. At this time, it is preferred that sand bags or equivalent be placed around the perimeter of the sheet for providing a seal for the vacuum. However, any means which assists in maintaining the vacuum seal with the ground is acceptable.

In operation, the heating blanket assembly 22, when energized, initiates a thermal front which moves down through the soil by thermal diffusion. As the soil is heated, organic compounds and water vapor are desorbed and removed from the soil matrix. At a given depth, water is boiled before the temperature can go above 100°C. Once boiled, the soil temperature can rise and semi-volatile contaminants and soil organics are vaporized and rise through the soil and are collected by the vacuum collection system.

Heating blanket units 26 may be used singularly or in groups, preferably, of twenty (20) units at a time to heat soil in-situ to a surface temperature of up to about 900°±100°C. Heating blanket units 26 are designed to be modular, are moveable, for example, by a small truck-mounted crane 40, and are readily serviced, including replacement of the heater and insulation components.

Two possible arrangements are a single row of modular units or two rows of modular units, with the single row arrangement being presently preferred when using individual heating units. However, when fully developed, the two row arrangement has the advantage of minimizing the perimeter and keeping the electrical connections away from the heat generated during operation. More than two (2) rows of heating modules does not significantly decrease the perimeter of the heated area and also makes the electrical and off-gas collection system distribution system significantly more difficult and complex.

One specific heating blanket unit 26 design criteria includes: operating temperature: 800°–1000° C. (1,472°–1, 832°F.); air flow rate: about 0.38 SCFM per square foot nominal (range of about 0.20 to about 0.5 SCFM/square foot); construction: modular, for example, eight (8)'×twenty (20)' standard sections; treatment area: nominal 3,200 square feet at a time, for example; minimum average soil temp.: 200° C.±25° C. (392° F.±45° F.) at treatment depth (3 to 6 inches deep); and heating cycle time: nominal 24 hours or less for 200° C. at three (3) to six (6) inch depth, as required to reach minimum average soil temperature at treatment depth.

One specific heating blanket unit 26 operational criteria includes: service location: exterior; heating cycle cold temperature: ambient; heating cycle hot temperature: 900° C. (1652° F.) nominal, 1000° C. (1832° F.) max; cycle time: 24 to 48 hours; duty cycle: Up to 100 cycles per year; and vapor generation/flow rate per module of: 60 scfm nominal, range of 10 to 90 scfm.

The remediation system 20, which includes the heating blanket assembly 22 of the present invention, has been proven to be effective for soil having the following characteristics before treatment: Density about 1.0 to about 2.5 g/cm$^3$; Porosity about 0.35; Moisture 5–35% by weight; Oil 500 mg/kg (varies by location and depth) PCB concentration about 1 to about 3,000 mg/kg (varies by location and depth—in areas of maximum PCB concentration where the heating blanket was successfully tested, the PCB concentration was 1000 to 3000 mg/kg in the top three inches, 100 mg/kg from 3 inches to 6 inches and less than 2 mg/kg below 6 inches); and Total Organic Content about 5 to 20 g/kg.

It is believed that the following soil treatment objectives can be met utilizing the heating blanket assembly of the present invention for any soil as long as the water table is below the depth of the contamination (or suppressed to be below): total PCB concentration less than 2 mg/kg composite average (for future unrestricted use of the site). It is also believed that the following air quality goals can be met utilizing the method and heating blanket system of the present invention: total PCB concentration less than or equal to 0.1 ug/m$^3$ (annual average at the site boundary).

In operation, the minimum average soil temperature should be about 200° C.±25° C. (392° F.±45° F.) at a treatment depth below which the pre-treatment PCB concentration is below the 2 mg/kg level, which was about 3 to 6 inches for one test site. The heating cycle time can be 24 hours or less, as required to reach minimum average soil temperature at treatment depth of about six (6) inches. Greater depths may be treated using longer heating cycle times.

Although the in situ thermal desorption heating blanket system of the present invention is most effective for remediation of shallow surface contamination, in another aspect of the present invention, deeper soil contamination could also be treated by selectively treating and then excavating the cleaned soil and then repeating the treatment process on the soil beneath or by excavating contaminated soil and staging it on a surface for treatment using an ex situ thermal desorption with the heating blanket system and methods of the present invention, such as placing the heating units under the soil and sucking or pulling the contaminants out of the top of the soil (sucking vapors past the heaters and through the soil will speed the heating process since molecular energy transport is more rapid than thermal diffusion) and, after treatment, return the treated soil to the excavated site of the contaminated soil.

If the depth of the contaminant is such that an ex-situ staging is determined to be the most economical use of the heating blanket, then the most efficient heating method using the thermal heating blanket of the present invention would be to arrange the equipment so that the heaters would be on one end (top or bottom) and the gases should be pulled through the soil to the opposite end (bottom or top). The reason for this is believed to be that thermal diffusion is slow and a significant portion of the energy applied to the system is used in heating gases. By pulling the gases through the soil, then the heating efficiency is increased and time is significantly decreased.

As disclosed above, the heating blanket unit 26 of the present invention includes at least one and preferably two stainless steel furnace belts 52, 56 (see FIG. 3). The top furnace belt 56 may not be necessary when 8 ft wide stainless steel sheets are attached along the 8 ft width of the unit. One key requirement of both the furnace belts 52, 56 is that they must be flexible in order to fit the contours of the soil to be treated.

The lower portion of the heating blanket unit 26 is flexible and the rigid components are constructed of overlapping units in order to compensate for expansion. Bolted connections in the lower portion of each heating blanket unit are slotted to allow movement, such as, for example, the connection between the preferred overlapping steel sheets which make up the impermeable member 80. Anchors, fasteners, and heater spacers are preferably made of 309 stainless steel.

In one specific embodiment, the furnace belt operational criteria includes: heating cycle cold temperature: ambient; heating cycle hot temperature: 875° C. (1607° F.) nominal 1000° C. maximum; cycle time: 24 to 48 hours; and duty cycle: up to about 100 cycles per year. Furnace belt functional criteria for each heating blanket unit includes: size of single unit belts: bottom belt about 96×about 264 inches, top belt about 96×about 240 inches; fabrication: 314 stainless steel; balance flat seat weave: top belt, 24 coils per foot width, 18 rods per foot length, 14 gauge rod, coils. (Model #B-24-18-14); bottom belt, 18 coils per foot width, 12 rods per foot length, 12 gauge rod, coils.

As an alternative insulation, batt type insulation 46 can be utilized for filling spaces between modules of each 20-module heating blanket assembly 22 configuration 34, 36, 38 which provides for continuity of thermal barrier over the heating units 26 and provides thermal protection to the silicone vapor barrier 50. An acceptable manufacturer of the batt material has been found to be Carborundum Product Fiberfrax Durablanket.

Insulation, whether it be vermiculite or batt type, should be installed within the unit frame without gaps or voids and without compression. The seams of each layer of insulation should be staggered. Further, the insulation should be neatly trimmed to fit spaces. Miscellaneous gaps and voids should also be insulated.

The top of each heating blanket unit frame should be insulated with one layer, leaving enough excess for insulation for the spaces between individual modules, and around the perimeter of each, for example, a twenty (20) module configuration. Off gas pipes and flanges should be insulated as necessary.

Care should be taken to ensure that air pockets and gaps during insulation placement are minimized. Further, care should be also be taken to minimize flexing and bending of heaters 44 during installation.

The impermeable sheet 50, such as, for example, a silicone sheet, that resists water vapor diffusion through it should be positioned over the heating blanket assemblies 34, 36, 38 to prevent vapor escape to atmosphere. The modular heating blanket units 26 must be Completely assembled prior to the installation of the silicone sheet. The presently preferred vapor barrier material is sheet barrier fabric #1032: white silicone rubber, 32 mil thick, minimum temperature rating 260° C. or 500° F. for silicone coating. Such a vapor barrier material is manufactured by Nashville Rubber Gasket Company. The silicone sheet is installed over the modular heating blanket assembly 22 with about a five (5) foot overlap onto the surrounding soil. A seal between the silicone sheets and the ground around the perimeter of the 20-module configuration is created, preferably with sand filled fire hose or sand bags (not shown).

A vacuum collection system 48 (see FIG. 1) or contaminant transporting means including a blower, preferably positioned on trailer 30, for establishing a slight negative pressure inside each heating blanket unit 26 is connected to each unit. The vacuum created by the blower in the vacuum collection system 48 sweeps clean air through and/or from the heat, treated soil which purges volatile and semi-volatile organic compounds (VOC's and SVOC's), water, and other gases from the soil pores and sweeps in air from surrounding soils which is needed to oxidize organics in the influent, within the heating elements, and within a thermal oxidizer 49. The off-gas is contained by the impermeable sheet 50 and collected via the blower. Air pollution control equipment is used to treat the off-gas, as necessary, to satisfy air emissions requirements.

The vacuum collection system 48 comprises the silicone fiberglass composite sheet vapor barrier 50, and a vacuum header vapor withdrawal and transport system for conveying collected vapors to one of the process trailer(s) 30. The silicone sheet 50 covers a group of up to 20 and possibly have modular heating blanket units 26 with an approximate five (5) foot sheet extension onto surrounding soil.

The silicone fiberglass sheet 18 should meet the following operational criteria: heating cycle cold temperature: ambient; heating cycle hot temperature: 250° C. (482° F.) nominal; cycle time: 24 to 48 hours; and duty cycle: Up to 100 cycles per year. The silicone fiberglass sheet 50 functional criteria should provide, for example, the following sizes for use in conjunction with varying heating blanket assembly arrangements:

| Quantity | Size |
| --- | --- |
| 4 | 50 feet × 90 feet |
| 2 | 50 feet × 50 feet |
| 2 | 30 feet × 60 feet |

The edges should be finished with a double fold and stitched with a minimum 1.5 inch hem for perimeter reinforcement. The fabrication seams length should be minimized using maximum available size sheet. All seams should be folded and stitched using fiberglass thread exceeding the strength and temperature rating of the sheet.

The modular pipe manifold section operational criteria should be as follows: heating cycle cold temperature: ambient; heating cycle hot temperature: 900° C. (1652° F.) at heating module outlet connections, to 350° C. (662° F.) at process trailer inlet connections; Cycle Time: 24 to 48 hours; and duty cycle: Up to 200 cycles per year.

The modular pipe manifold section functional criteria should include the following sizes for use in conjunction with varying heating module arrangements:

| Quantity | Length/Features |
|---|---|
| 30 | 16 feet long, with two (2) horizontal 2-inch diameter flanged ports with balancing blast gates |
| 20 | 20 feet long |
| 6 | 10 feet long |
| 6 | 90° elbow |
| 6 | 5 foot flexible sections |
| 6 | 2 foot flexible sections |

The manifold section features a pipe construction made of, preferably, 316 smooth, solid wall and corrugated flexible stainless steel. Supports are also, preferably, made of 316 stainless steel welded to the pipe. Blast gates for balancing the vacuum evenly to all heating modules are, preferably, made of 316 stainless steel with ceramic stem packing and non-asbestos ceramic paper gaskets. A minimum 2-inch thick ceramic fiber insulation with aluminum jacket provides for protection from moisture and physical damage. Flexible sections provide expansion compensation during field set-up and operation.

In operation, the heating blanket assembly 22 and methods of the present invention are designed to be used with a system 20 that remediates an area of approximately 3,200 square feet at a time. Each 3,200 square foot area will be first heated with a heating blanket assembly group comprising a plurality of heating blanket units 26 to a temperature of about 800° to about 1,000° C. (about 1,472° to about 1,832° F.) heater and off-gas temperature. The heating blanket units 26 will be operated until a minimum average soil temperature of about 200° C.±25° C. is achieved at a target depth of about 3 inches to about 6 inches.

An average temperature of [200° C.±25° C. (392° F.±45° F.)] at the treatment depth below which the PCB concentration is below 2 mg/kg is known to volatilize moisture, oil, and PCBs. The soil treatment objective of the method and assembly of the present invention is to achieve a composite average residual PCB concentration of less than 2 mg/kg in the soil in order to provide for future unrestricted use of an originally contaminated site. The actual time required to reach the necessary soil temperature will vary based on the soil moisture content at the beginning of the heating cycle and is likely to be between about 18 to about 24 hours with a heater temperature of about 900° C. normally and for a six (6) inch depth in a normally hydroscopic soil. The endpoint of the heating cycle will therefore be defined by the-average soil temperature rather than the time.

Off-gas, which may or may not contain PCBs or other contaminants, will be withdrawn from the group of heating blanket units 26 through a series of parallel steel pipes or channels placed within blanket assembly 22 (typically, as illustrated one withdrawal port per eight (8) feet wide module). Off-gas will be withdrawn at a rate of approximately about 900 standard cubic feet per minute (scfm). The air flow rate is designed to achieve a minimum excess oxygen content in the oxidizer off-gas system of about 1.5 percent and to ensure a negative pressure within the heating-system for positive collection of off-gases. The target composition of the off-gas from the heating blanket for a representative site is summarized in Table 1-1. This data is based upon average soil concentrations in the most contaminated areas of a representative site and an even distribution of PCBs throughout the treatment cycle. Long term average concentrations will therefore be lower. Soil organics dominate total hydrocarbon and carbon oxidized by the thermal oxidizer.

TABLE 1-1

Air Stream Contaminant/Loading Computation

| Soil Parameters | |
|---|---|
| Soil Type | Sandy |
| Soil Density | 1.7 g/cm$^3$ |
| Soil Porosity | 0.35 |
| Soil Total PCB Content | 500 mg/kg* |
| Soil Oil Content | 500 mg/kg* |
| Soil Hydrocarbon Content (as $CH_2$) | 1–2% by weight (10–20 g/kg) |
| Soil Water Content | 0.1 g/g nominal, range: .05–.17 g/g |

| Representative Quantities Per 3,200 Square Foot Treatment Area (at maximum power input of 90 kW per module) | |
|---|---|
| Total Soil to 6" Depth | 77,000 kg |
| Total Water (20 hours heating) | 11,100 kg |
| Total Weight of PCBs | 38 kg |
| Total Weight of Oil | 38 kg |
| Total Soil Hydrocarbons (20 hours heating) | 670 kg |
| Water Flow Rate | 520 kg/hr |
| Average Carbon Flow Rate (after initiation of autooxidation) | 33.5 kg/hr |

| Effluent Vapor Composition Per 3,200 Square Foot Treatment Area At Power Input Of 90 kW/module | |
|---|---|
| Water | 406 scfm |
| Total Hydrocarbons (as $CO_2$) | 37 scfm |
| Oxidizer Fuel Required (as propane) | 11.5 scfm |
| Net additional Air Required To Oxidize Hydrocarbons** | 245 scfm |
| Net additional Air Required To Oxidize Fuel Gas*** | 197 scfm |
| Air Required To Yield 2% Excess $O_2$**** | 94 scfm |
| Total Vapor Flow Exiting Oxidizer | 990 scfm***** |

Notes:
*This table represents system design loading. Sitewide average contaminant concentrations will be lower than those shown but soil organics will dominate the oxidation process.
**Based on the equation for soil organic ($CH_2$) combustion: $CH_2 + 1.5[O_2 + (.79/.21)N_2] \rightarrow CO_2 + H_2O + 1.5(.79/.21)N_2$
***Based on the equation for propane combustion: $C_2H_6 + 3.5[O_2 + (.79/.21)N_2] \rightarrow 2CO_2 + 3H_2O + 3.5(.79/.21)N_2$ with a net energy release from the combustion of propane of 2370 kJ/scf and the energy required to heat air and water from 400° C. to 1000° C. being 25kJ/scf and 31kJ/scf respectively.
****Taking the $O_2$ content in air as 21% and the remainder being $N_2$.
*****Actual system flow rate may be set at up to 1,500 scfm in order to draw additional excess air and to allow for higher water flow rates based on field conditions.

The off-gas will be withdrawn from the group 34 of heating blanket units 26 and pass through insulated and/or heat traced steel pipes and/or flexible tubes, and through a particulate filter, into a thermal oxidizer 49 designed to raise the gas temperature to approximately about 870° C. to about 980° C. (about 1,600° F. to about 1,800° F.). Oxidation of oil, PCBs, and other organic compounds volatilized from the soil will occur in each modular heating blanket unit, the transfer pipe system 48, and the thermal oxidizer 49.

The off-gas from the thermal oxidizer will then pass through a Granular Activated Carbon (GAC) vessel 33 housed on the trailer 30 near to the thermal oxidizer 49, heated to a temperature of between about 110° C. and about 180° C. (about 230° F. to about 356° F.) to prevent condensation of water vapor in the off-gas. The GAC vessel provides a polishing step to remove organic compounds (if any) that were not oxidized in the thermal oxidizer, and to provide a backup to the oxidizer in case of an oxidizer shutdown.

If permitting regulations require, it might be necessary to utilize an HCl scrubber. The scrubber material must be capable of operating at 110° C.±10° C. in the presence of steam of the order of 50% by volume.

The only limiting factor in the application of the system 20 to contaminated soil is that the water table of the treated soil be below the depth of treatment or at least must be capable of being suppressed below the maximum treatment depth.

In operation, each heating blanket unit 26 of the heating blanket assembly 22 of the present invention comprises three phase 480 volt electrical resistive heating elements connected in delta configuration providing about 563 watts per square foot of heated area. The heating elements 44 are placed in the lower portion of the unit 26 in order to be in close proximity to the soil where they are operated for a sufficient period of time to desorb the contaminants being treated. For PCBs in surface soil, the time period is on the order of twenty-four (24) hours to desorb contaminants at depths down to about six inches. For shallower contamination, the heating period is significantly shorter whereas heating periods of two to four days may be required for depths to one foot. The water content of the soil, the soil grain size, and rate of heater sheath temperature have a major impact on the required heating times. As the contaminants are desorbed from the soil by the heat, they are drawn to the surface by the off-gas collection system. As the contaminants pass through the soil surface and heating elements, most of the hydrocarbons are oxidized because of the high temperatures (800° C. to 1,000° C.) present in this region.

The openings in the furnace belt allow the desorbed vapors to pass readily to the off-gas collection system 48. Using a furnace belt as opposed to only a solid metal sheet provides for easy vertical flow of the desorbed vapors to the off-gas collection system 48 and also serves to protect the heaters from mechanical destruction and avoids thermal expansion problems of a solid metal sheet as well as facilitates the heater conforming to the soil surface.

The heating blanket support structure includes means to accommodate the above components and to provide a means for lifting and transporting the heating blanket assembly 22. The lifting means can include wheels or jacks in the corners to enable overground movement of the heating blanket units 26 or can include accommodations for lifting the heating blanket units 26 by overhead cranes 40 as could be utilized when the system is in a "batch" treatment mode.

Essentially all of the remediation system components are modular and are either trailer mounted (in the case of electrical and process equipment) or transportable by truck in partially or completely fabricated and assembled form (in the case of modular heating blankets). Therefore, after site preparation is completed, fabricated equipment units will be shipped from the fabrication/assembly shop to the site for final assembly and shakedown testing. Heating blanket and equipment storage, as well as final assembly may be conducted within a temporary structure on site, along with maintenance during actual remediation.

Movement and set-up of equipment at specific operating locations on site is expected to be accomplished via towing of trailers and movement of heating blanket units 26 using the truck-mounted crane 40 or other similar construction equipment.

As shown in FIG. 1, for a project requiring the treatment of a large area, such as, for example, an area of treatment and control heating blankets, approximately 580,000 square feet of soil, three sets of modular heating blanket units and two sets of treatment and control systems constitute one site system of the present invention which applies heat to up to 3,200 square feet per heating cycle while the previous heating cycle treatment area cools, still connected to the other heating blanket, treatment and control system.

Although the heating cycle time and daily operating schedule will be refined through the completion of engineering field testing and experience gained during the particular remediation at a particular site, it is presently anticipated that each area treated will go through a two to three day treatment cycle. On the first day, the modular heating blankets will be moved from a prior treated area, assembled, and inspected for proper functioning. To begin treatment, electric power will be applied to the heaters for a period sufficient (estimated to be 18 to 24 hours), to reach the target average soil temperature (200° C.±25° C. at a depth of about six (6) inches). Next, power will be shut off to the heating blankets, and the heating blanket will be allowed to cool, while the off-gas is being collected from the treatment area and the air pollution control system is still being operated until the treatment has been completed. It is possible, with operating experience at any one particular site, that the treatment schedule can be shortened (heating, cooling, and moving might be able to be completed within a 48 hour period) with the sequence remaining the same.

The cooling period is important because thermally stressing the system components should be avoided, such as rapid thermal contractions. A four (4) to about an eight (8) hour cool down period is advised to avoid thermal stressing problems.

One operational approach for effective, cost efficient remediation requires a three heating cycle supply (approximately 9,600 square feet) of heating blanket units 26, two air treatment process sub-systems together capable of treating vapors from two groups of heaters (3,200 square feet heating and 3,200 square feet cooling), and a power supply system 24 capable of supplying power to one heating cycle (3,200 square feet of modular heating blanket units) plus two off-gas treatment processes. The two process sub-systems are needed because while one area is being actively heated, another is still cooling down. Both of the treatment areas require vapor control systems until reasonably complete cooldown is achieved.

It is anticipated that two separate treatment process trailers 30 will be operated such that the vapor stream from the first group of heating blankets 26 energized will be treated in the first system and will remain connected to that system during the initial cooldown period. On startup, vapors from the second group of heating units 26 will then be directed to the second trailer mounted treatment process system. Once cool down of the first group of modular heating blanket units is complete, the first system process treatment trailer would then be connected to the third group of modular heating blanket units and prepared to begin the third heating cycle.

The actual sequence of movement across a site will be initially determined before the start of actual remediation, and may be modified based on field conditions and operating experience. The sequence of movement should be based on the following criteria: the distance heaters must be moved between uses should be minimized; the distance from the heating blankets to the electrical supply and treatment process should be minimized; the number of times the process and electrical trailers are moved should be minimized; and crossing of power and control cables and off-gas manifold pipes should be minimized.

It is anticipated that the remediation system 20 which includes the heating blanket assembly 22 will operate 24 hours per day and each heating cycle will ideally begin within a few hours after the prior heating cycle ends. This approach will, among other advantages, make the best use of available power. In general, it is preferred that the movement of modular heating blanket units will take place during the next daylight period following completion of treatment and cool down so that most movement and assembly work is conducted during daylight hours.

A typical site crew would include one or two system operators, a crew of technicians involved in moving heating blankets and connecting piping and power cables, and a health and safety technician. Equipment required on site will include a boom truck, crane, or other equipment capable of lifting and positioning modular heating blanket units, a truck used to move treatment process and process control trailers on an estimated weekly basis, and a variety of hand tools.

The site remediation process will generally proceed across the site in a stepwise manner so as to allow the process, control and support equipment to be placed on soils which are clean and/or already treated. This should minimize the need for equipment decontamination, and allow for maintenance of the equipment outside of the contaminated "hot zone" of the site. Movement of the process trailers and/or electrical distribution trailer may periodically result in a "down day" during which no heating cycle will take place. In a typical site remediation "down days" are anticipated to represent approximately 4 to 5 days per month, or about 15 percent of the time.

The daily (2 to 3-day) operational sequence of a given group of heating blanket units is described in more detail below. Note that certain start-up and shutdown procedures occur only when the entire system is moved, and not at the end of each heating cycle.

EXAMPLE

Heating tests on PCB contaminated areas were conducted in three one hundred square foot areas containing PCB contamination at a site where oil containing PCBs had allegedly been used for dust control in the 1960's. Results of these tests demonstrated that the system could consistently achieve the target cleanup level of <2 ppm composite average PCB concentration while concurrently meeting air emission guidelines, and ensuring worker safety.

Several other heating tests were conducted in non-PCB contaminated areas to better understand the heating process and off-gas processing in order to improve the system design.

Records which document results, discussions, and correspondence related to the field pilot treatability study and subsequent engineering tests of this process including the testing of a prototype heating blanket modular unit 26 of the full-scale remediation system 20 were kept and are available.

Equipment Assembly and Start-up Procedures

Once the heating blanket units 26 have been mobilized to the site and final fabrication has been completed, the full remediation system 20 is assembled. The remediation system 20 assembly procedures are generally divided into modular heating blanket unit assembly and treatment process and control trailer assembly. Generally, one of three (3) groups 34, 36, 38 of twenty (20) heating blanket units 26 will be moved and assembled each day. Each of the two treatment processes and control trailer systems 30 will be moved approximately every nine (9) days.

Heating blanket unit 26 assembly involves placing thermocouples into the soil, placing the individual heating modules in position, assembling the vacuum manifold system, installing the silicone sheet vapor barrier 50 over the heating blanket, assembly 22 and making electrical and thermocouple connections. These procedures should be conducted in accordance with a heating blanket assembly SOP. A heater blanket assembly inspection checklist should also be completed during and after blanket assembly activities.

When movement of the treatment process and control trailers is required, a trailer assembly SOP should be followed. This SOP describes setting, leveling, and blocking of trailers, connecting power and instrument cables between trailers, connecting heated sample lines between trailers and filling propane tanks.

A Trailer Start-up SOP should describe methods for preheating the flameless thermal oxidizer, including turning on the preheat propane supply and energizing the exhaust blowers. Hot air moving through the system heats up piping and other components, and the heat exchanger control and heat tracing are set to their standard set points to stabilize the system temperature profile. An emissions monitoring system calibration SOP should also be followed and documented. Once completed, the treatment system is ready to begin treatment of contaminated vapors extracted form the contaminated soil.

Utilizing the heating blanket assembly SOP, the temperature of groups of one (1) to ten (10) to twenty (20) heating blanket units are raised to the temperature set point in one or more steps over a period of about fifteen (15) minutes to several hours. During the heating period, vapor flows are balanced and checked. Once concluded, the treatment system is operational for treating site soils. Some concerns during temperature ramp up are: (1) possible removal of water in the heater could-ends depending on the chosen heaters, their cold end moisture seal and the amount of time they have been idle since their previously heating cycle; (2) thermal stress on the heater due to thermal expansion should be limited.

Standard Operating Procedures (SOPs) are actions taken by the remediation system 22 operator(s) to maintain optimum process conditions, ensure data quality objectives are met, and ensure the system operates safely. The soil remediation process is controlled on a supervisory basis by programmable logic controllers, which automatically maintain process parameters within a preset range. The system operator is notified by the system via visible and audible alarms of a variety of system alarm (out of set point range) conditions, and SOPs for:response to these alarms have been developed.

Shut-down procedures indicate the actions the operator will take to shut down all or part of the in-situ thermal desorption system 20, as appropriate. Groups 34, 36, 38 of heating blanket units 26 will be shut down at the end of each treatment cycle. The treatment systems will be completely shutdown when they are to be moved, and may be shut down or remain in operation at the end of each heating cycle. Depending on the rate of equipment cool down after being shut down, the operator may determine that heat should continue to be supplied to the system in operation, rather than going through shut-down and start-up between heating cycles.

Upon completion of each heating cycle, the modular heating blanket units 26 and/or the process trailers 30 will be demobilized and transported to the next treatment area. The heating blanket units 26 will be moved each heating cycle, while the locations of process trailers will be optimized such that they are each moved preferably approximately on a weekly basis.

Demobilization of the heating blanket units from one treatment area will generally be conducted concurrently with set-up in another area such that both SOP's will be followed concurrently. In some cases, heating blanket units 26 may be demobilized and stored.

The modular heating blanket assembly area, such as, for example, 3200 square feet, for treatment should be set up as follows: layout and mark area to be treated in the field, 40'×80'. (or 20'×160' if straight heaters with electrical connections on both ends are used) area when possible—smaller areas or alternate dimensions will be necessary in many cases due to field conditions; insert thermocouples into soil at six inch (6") depth (or alternate target treatment depth) one per module or at a minimum of one per 100 square feet; position the heating blanket units using a boom truck or crane or other appropriate means. Heating blanket Units 26 should be set with a two-inch (2") gap between steel frames. Use the insulation on the sides of the modules to fill this two-inch gap; assemble the modular vapor collection manifold, with a branch inlet near each heating module. Bolt sections together using high temperature gaskets, such as ceramic fiber or graphite. Connect each heating blanket unit 26 to the manifold; place one-foot (1) wide insulation adjacent to exposed sides and ends of units 26.

Insulation is not required at the electrical connection/vapor outlet end, as the units 26 are constructed with insulation in place; place heating module power and thermocouple cables from control trailer (do not connect at trailer end) to treatment area; connect 4-conductor electrical connection for each module; set thermocouple transmitter panels in place (one per 5 modules) and connect soil and heater thermocouples. Connect the control cable leading to control trailer to the panel; place large silicone rubber sheet over heating module group with five (5) foot overlap onto soil all around. Eliminate folds and ruffles to the extent possible; place sand filled fire hose, sand bags, or equivalent around silicone sheet perimeter to improve vapor seal of sheet to the soil; and when the process and control trailers are available for use (after the prior set of modules is disconnected), plug in all power and control cable connections to the control trailer, and connect vapor manifold(s) to the process trailer 28 inlet.

After assembly, perform an inspection of the heating blanket assembly 22 as follows: record thermocouple and heating module locations on a site map keyed to site grid system; inspect heating blanket units 26 as they are placed and note any gaps in insulation, cracked or bent metal components on reverse of checklist; check placed units for gaps between units, or between units and surrounding insulation which could cause vapor pockets; check for proper gaskets in two-inch (2") vapor pipes; check silicone blanket 50 and ballast for proper perimeter seal; check all electrical and thermocouple connections for proper (corresponding) numbering and good condition; at control trailer panel, check heater resistances and record; and check all thermocouple readings (should read ambient temperature) to identify any open connections.

Prior to turning on the heating blanket assembly 22, the following steps, preferably, should be performed: confirm that the heating blanket set up inspection and trailer start up inspections have been conducted; check that personnel are clear from heating blanket area and signs are posted; from the personal computer (PC) console (or directly on power supply face) set blanket heater temperature set point for modules 1 to 5 at about 150° C. (150° C. is chosen since it is low enough to minimize soil heating during this stage and will not commence oxidation of any soil organics or contaminant and will also remove any possible water from the heater insulation in the case of the chromolox type heaters which have mica electrical insulation on the cold ends). Set 6 to 10 at 150° C. Set 11 to 15 at 150° C. Set 16 to 20 at 150° C. Check all 60 heater thermocouples to ensure all heaters are powered and heating at low level; balance vapor flow between units in accordance with heating blanket assembly operation SOP; turn up set points in groups of 1 to 20 modules (usually 5) in stages over a period of 1 to 12 hours. Check that temperature has approached (usually within 50°) set point at each step.

In normal site operating conditions, all set points can be raised to target temperature between 800° C. and 1000° C. within one hour; and coordinate start up with process operation SOP. If flow decreases, or becomes imbalanced, oxygen or carbon monoxide levels approach warning levels, or system temperatures approach warning levels, delay set point increases and/or take corrective action, in accordance with the Process Operation SOP.

When in operation, the heating blanket assembly 22 should, preferably, be monitored as follows: check vacuum at outlet from each heating blanket unit 26. Record all vacuum readings prior to making any adjustments. Adjust 2-inch gates at unit as necessary to balance flow; if average vacuum at outlet ports of heating unit falls below 2' w.c. vacuum after balancing, increase vacuum level by increasing process flow rate (check that rate will still be within allowable range) or decreasing vapor generation rate by decreasing heating blanket. unit(s) temperature; after maximum water peak (minimum oxygen level) has passed, heating blanket units setpoints may be raised to 900° C. or 1000° C. in order to increase soil heating rate. Check process variables after any increase; and when soil thermocouples reach 200°±25° C. average temperature, shut down heating blanket units to end treatment cycle.

Additionally the following should also be accomplished: walk perimeter of heating area to check for any evidence of vapors escaping under silicone sheet. Record findings on reverse of form; note any evidence of hot spots on silicone sheet such as discoloration of sheet (an infrared camera can also be used to observe any potential hot spots on the impermeable silicone-fiberglass sheet). Note any odors if noticed incidentally; walk length of piping and electric cables once per hour and note any evidence of damage to gaskets or other materials; record vacuum readings at each heating module outlet; and check soil temperature thermocouple readings and record Upon completion of the remediation cycles, the heating blanket assembly 22 should be shut down as follows: turn off heating blanket units at power supply or from PC console; shut off and lock out main blanket power supply; and leave warning/temperature hazard signs in place until blanket and piping temperatures are at safe levels. Then clear area with health and safety technician prior to heating blanket demobilization.

The procedure which should be utilized for heating blanket assembly demobilization is as follows: shut off and lock out heating blanket unit power supplies; unplug heating blanket unit power and control cables; remove fire hose ballast and field or roll up silicone fiberglass sheet; remove perimeter insulation units; disconnect pipe manifold. Portions may be left connected to process trailer if locations are convenient for next set of modules to be set up; move heating blanket units directly to next area to be treated or to storage area; and remove soil thermocouples.

When the overall remediation has been concluded, the equipment will be disassembled and prepared for storage or re-use at another facility in accordance with the applicable regulations.

All wastes generated during the soil remediation will be properly handled, stored, and disposed. The procedures for handling and disposing the wastes anticipated during operations should be described in the appropriate regulations.

While the apparatus and methods herein described constitute preferred embodiments of the invention, it is to be understood that the invention is not limited to these precise apparatus and methods, and that changes can be made therein without departing from the scope of the invention which is defined in the appended claims.

What is claimed is:

1. A rigid heating blanket for use in soil remediation comprising:

rigid heating blanket support structure;

at least one furnace belt;

heaters positioned within the at least one furnace belt;

a connection mechanism connecting the at least one furnace belt to the heating blanket support structure;

impermeable means, connected to the heating blanket support structure and positioned immediately above the at least one furnace belt; thermal insulation material within the support structure immediately above the impermeable means filling the space between the impermeable means and support structure, and contaminate collection means, connected to the impermeable means, for transporting the resulting contaminates removed from the soil to a contaminate processing means.

2. A heating blanket for use in soil remediation comprising:

rigid heating blanket support structure; an upper and a lower furnace belt, the lower belt having the heaters positioned therein;

a connection mechanism comprising: a shackle connected to a rod positioned in the at least one furnace belt; and a connection means, connected to the heating blanket support structure and the shackle;

a plurality of stainless steel sheets each connected together and connected to the heating blanket support structure, the sheets being positioned above the lower furnace belt; thermal insulation material within the frame structure above the steel sheets and contaminate collection means, connected to the sheets, for transporting the contaminates removed from the soil to a contaminate processing means.

3. A rigid heating blanket for use in soil remediation comprising:

a rigid heating blanket support structure;

an upper and lower furnace belt;

heaters positioned within the lower furnace belt;

a connection mechanism connecting the at least one furnace belt to the heating blanket support structure;

impermeable means, connected to the heating blanket support structure and positioned immediately above the at least one furnace belt; heaters positioned within the at least one furnace belt; thermal insulation material within the support structure immediately above the impermeable means filling the space between the impermeable means and the support structure, and contaminate collection means, connected to the impermeable means, for transporting the resulting contaminates removed from the soil to a contaminate processing means.

4. A rigid heating blanket for use in soil remediation comprising:

rigid heating blanket support structure;

at least one furnace belt;

heaters positioned within the at least one furnace belt;

a connection mechanism connecting the at least one furnace belt to the heating blanket support structure and comprising a shackle connected to a rod positioned in the at least one furnace belt;

impermeable means, connected to the heating blanket support structure and positioned immediately above the at least one furnace belt; thermal insulation material within the support structure immediately above the impermeable means filling the space between the impermeable means and the support structure; and contaminate collection means, connected to the impermeable means, for transporting the resulting contaminates removed from the soil to a contaminate processing means.

* * * * *